US012669192B2

(12) United States Patent
Wu et al.

(10) Patent No.: US 12,669,192 B2
(45) Date of Patent: Jun. 30, 2026

(54) DELUGE VALVE ASSEMBLY

(71) Applicants:Huaneng Nuclear Energy Design and Research Institute Co., Ltd, Shanghai (CN); Huaneng Group Technology Innovation Center Co., Ltd, Beijing (CN); Sureland Industrial Fire Equipment (Hebei) Co., Ltd, Jinzhou City (CN)

(72) Inventors: Xiao Wu, Shanghai (CN); Jilan Zhang, Shanghai (CN); Yong Jiang, Shanghai (CN); Peng Yang, Shanghai (CN); Xiao Yan, Shanghai (CN); Quanjun Dong, Shanghai (CN); Yinan Liu, Shanghai (CN); Cheng Li, Shanghai (CN); Hongquan Zhao, Shanghai (CN); Jinchao Chen, Shanghai (CN); Shuangquan Guan, Shanghai (CN); Qiangqiang Yang, Shanghai (CN)

( * ) Notice: Subject to any disclaimer, the term of this patent is extended or adjusted under 35 U.S.C. 154(b) by 168 days.

(21) Appl. No.: 18/507,594

(22) Filed: Nov. 13, 2023

(65) Prior Publication Data

US 2024/0309960 A1     Sep. 19, 2024

(30) Foreign Application Priority Data

Mar. 16, 2023     (CN) .......................... 202310259464.3

(51) Int. Cl.
*F16K 27/02*        (2006.01)
*A62C 35/68*        (2006.01)
(Continued)

(52) U.S. Cl.
CPC .......... *F16K 27/0236* (2013.01); *A62C 35/68* (2013.01); *A62C 37/50* (2013.01); *F16K 27/12* (2013.01); *Y10T 137/6851* (2015.04)

(58) Field of Classification Search
CPC ......... A62C 37/50; A62C 35/58; A62C 35/68; F16K 27/0236; F16K 27/12;
(Continued)

(56) References Cited

U.S. PATENT DOCUMENTS 5,236,049 A * 8/1993 Asselin .................. A62C 35/64
169/17
5,992,532 A * 11/1999 Ramsey ................. A62C 35/60
169/17

(Continued)

*Primary Examiner* — Craig M Schneider
*Assistant Examiner* — Jonathan J. Waddy

(57) ABSTRACT

The deluge valve assembly includes: a deluge valve, in which the deluge valve includes a water inlet cavity, a water outlet cavity, and a diaphragm cavity. The water inlet cavity is suitable for communication with the fire protection pipe network so as to make water from the fire protection pipe network flow into the water inlet cavity; a water inlet pipeline, in which an inlet of the water inlet pipeline is connected with the water inlet cavity, and an outlet of the water inlet pipeline is connected with the diaphragm cavity; a water outlet pipeline, in which an inlet of the water outlet pipeline is connected with the diaphragm cavity; reinforcement members, in which at least two of the deluge valve, the water inlet pipeline, and the water outlet pipeline are connected through the reinforcement members. The deluge valve assembly has advantages of good performance in anti-vibration and reliability.

8 Claims, 9 Drawing Sheets

(51) Int. Cl.
    *A62C 37/50*       (2006.01)
    *F16K 27/12*       (2006.01)

(58) Field of Classification Search
    CPC ............. F16K 37/005; Y10T 137/6851; Y10T
                     137/6966; Y10T 137/6969; Y10T
                     137/6973; Y10T 137/698; Y10T
                     137/7043; Y10T 137/7062
    USPC ........ 137/343, 356, 357, 358, 360, 377, 382
    See application file for complete search history.

(56)                   References Cited

U.S. PATENT DOCUMENTS

| | | | | |
|---|---|---|---|---|
| 2007/0289751 A1* | 12/2007 | Feenstra | ................ | A62C 35/68 |
| | | | | 169/17 |
| 2010/0263881 A1* | 10/2010 | Fritz | ...................... | A62C 35/68 |
| | | | | 169/5 |
| 2014/0264104 A1* | 9/2014 | Ringer | ................... | A62C 35/68 |
| | | | | 251/61.2 |
| 2015/0219233 A1* | 8/2015 | Ringer | ................ | F16K 37/0025 |
| | | | | 137/535 |
| 2017/0326396 A1* | 11/2017 | Pohl | ........................ | F16K 27/12 |
| 2018/0064977 A1* | 3/2018 | Galletti | .................. | A62C 35/62 |
| 2019/0257438 A1* | 8/2019 | Naor | ................... | F16K 27/0236 |
| 2021/0244984 A1* | 8/2021 | Feenstra | ................ | A62C 35/68 |
| 2023/0134915 A1* | 5/2023 | Williams | ............ | F16K 27/0236 |
| | | | | 169/16 |

* cited by examiner

DELUGE VALVE ASSEMBLY

TECHNICAL FIELD

The invention relates to the field of fire protection technology, and in particular to a deluge valve assembly.

BACKGROUND

The fire deluge valve assembly is a high-efficiency control valve assembly and is a critical component of automatic water-sprinkling system and water spray fire extinguishing systems. The main valve of the diaphragm-type deluge alarm valve adopts a diaphragm to divide the main valve into upper and lower chambers, in which the upper chamber is a control chamber. The difference in area between the upper and lower chambers can be applied to generation of water pressure to achieve main valve sealing. In related technologies, the deluge valve assembly is poor in anti-vibration effect. When vibration occurs, the pipes of the deluge valve assembly are easily offset, causing the pipe connections to be disconnected, which in turn makes the deluge valve assembly easily damaged and reduces the low reliability thereof.

SUMMARY OF INVENTION

The present invention aims to solve one of the technical problems in the related art, at least to a certain extent. To achieve this issue, embodiments of the present invention provide a deluge valve assembly.

The deluge valve assembly according to an embodiment of the present invention includes:

a deluge valve, in which the deluge valve includes a water inlet cavity, a water outlet cavity, and a diaphragm cavity, and the water inlet cavity is suitable for communication with a fire protection pipe network, so as to make water from the fire protection pipe network flow into the water inlet cavity;

a water inlet pipeline, in which an inlet of the water inlet pipeline is connected with the water inlet cavity, and an outlet of the water inlet pipeline is connected with the diaphragm cavity;

a water outlet pipeline, in which an inlet of the water outlet pipeline is connected with the diaphragm cavity;

reinforcement members, in which at least two of the deluge valve, the water inlet pipeline, and the water outlet pipeline are connected with each other through the reinforcement members.

Therefore, the deluge valve assembly according to an embodiment of the present invention has the advantages of well performance in anti-vibration and reliability.

In some embodiments, the reinforcement members include:

a first reinforcement member, in which the deluge valve and the water outlet pipeline are connected with each other through the first reinforcement member;

a second reinforcement member, in which the deluge valve and the water inlet pipeline are connected with each other through the second reinforcement member;

a third reinforcement member, in which the water outlet pipeline and the water inlet pipeline are connected with each other through the third reinforcement member.

In some embodiments, the deluge valve includes a valve body, a seal member, and a valve cover. The seal member includes a mounting ring and a diaphragm located inside the mounting ring. The valve body, the mounting ring, and the valve cover are connected in sequence in a first direction, the seal member and the valve cover define the diaphragm cavity, and the diaphragm is movable in the first direction so that the diaphragm has a first position and a second position, where, in the first position, the water inlet cavity and the water outlet cavity are separated by the diaphragm, and, in the second position, the water inlet cavity and the water outlet cavity are connected with each other;

a plurality of protruding stages are provided on an outer surface of the valve cover, in which a first end of the first reinforcement member is connected to the protruding stages, and a second end of the first reinforcement member is connected to the water outlet pipeline.

In some embodiments, the water outlet pipeline includes:

a first tube body, in which the first tube body extends along the first direction;

a second pipe body and a third pipe body, in which an end of the first pipe body is provided on the valve cover and connects with the diaphragm cavity, another end of the first pipe body is connected with the second pipe body and the third pipe body through a tee, the second pipe body and the third pipe body both extend along the second direction, the second pipe body and the third pipe body are located on both sides of the first pipe body in the second direction, the number of the first reinforcement members is two, the two first reinforcement members are located on both sides of the first pipe body in the second direction, and the second ends of the two first reinforcements are connected with the second pipe body and the third pipe body, respectively;

a first pressure gauge is provided on the second pipe body, in which a first manual valve is provided at an outlet of the second pipe body;

a first filter is provided on the third pipe body, in which a first solenoid valve is provided at an outlet of the third pipe body.

In some embodiments, the water inlet pipeline includes:

a fourth pipe body, in which the fourth pipe body extends along the second direction, the fourth pipe body is connected with the valve body, and a second filter is provided on the fourth pipe body;

a connecting pipe, in which a one-way valve is provided on the connecting pipe, the water inlet cavity, the fourth pipe body, the connecting pipe, and the diaphragm cavity are connected to each other in sequence, one end of the third reinforcement member is connected with the connecting pipe, and another end of the third reinforcement member is connected with the water outlet pipeline.

In some embodiments, the diaphragm cavity is provided with an elastic member inside connected with the diaphragm and the valve cover, and the elastic member is able to elastically deform in the first direction;

each of the protruding stages has a mounting slot, in which a first end of the first reinforcement member is threadedly connected to the mounting slot, and a second end of the first reinforcement member is provided with a pipe clamp connected with the water outlet pipe;

the water inlet pipeline further includes:

a first communication pipe and a second communication pipe, in which the first communication pipe and the second communication pipe are both provided on the valve cover and communicate with the diaphragm cavity, the first communication pipe and the second communication pipe are located on both sides of the first pipe body in the second direction, and the first communication pipe is provided with an anti-reset valve;

the connecting pipe includes:

a first connecting pipe and a first connecting sub-pipe, in which the first connecting pipe extends along the first direction, the one-way valve is provided on the first connecting pipe, and the fourth pipe body, the first connecting pipe, the first connecting sub-pipe, and the first communication pipe are connected with each other in sequence;

a second connecting pipe and a second connecting sub-pipe, in which the second connecting pipe extends along the third direction, the fourth pipe body, the first connecting pipe, the second connecting pipe, the second connecting sub-pipe, and the second communication pipe are connected with each other in sequence, a second manual valve is provided on the second connecting pipe, and any two of the first direction, the second direction, and the third direction are perpendicular to each other;

one end of the third reinforcement member is connected with the second connecting pipe, and another end of the third reinforcement member is connected with the third pipe body.

In some embodiments, the water inlet pipeline further includes a fifth pipe body connected with the fourth pipe body, in which the fifth pipe body extends along the third direction, the fifth pipe body is provided with a second pressure gauge and a PH meter, a second solenoid valve is provided at an outlet of the fifth pipe body, and the fifth pipe body is connected with the deluge valve through the second reinforcement member.

In some embodiments, the deluge valve further includes:

a water inlet pipe, in which the water inlet pipe is connected with the water inlet cavity, the water inlet pipe is provided with a water inlet signal butterfly valve, and both ends of the second reinforcement member are connected with the fifth pipe body and the water inlet pipe, respectively;

a water outlet pipe, in which the water outlet pipe is connected with the water outlet cavity, the water outlet pipe is provided with a water outlet signal butterfly valve, and the water inlet pipe and the water outlet pipe are located on both sides of the valve body in the third direction.

The deluge valve assembly according to an embodiment of the present invention further includes:

a sixth pipe body, in which an inlet of the sixth pipe body is connected with the water outlet cavity, a third pressure gauge is provided on the sixth pipe body, and a third manual valve is provided at an outlet of the sixth pipe body;

a seventh pipe body, in which the seventh pipe body and the sixth pipe body are located on both sides of the valve body in the second direction, the seventh pipe body includes a first pipe section, a second pipe section, and a third pipe section that are connected with each other in sequence, the first pipe section is provided with a fourth manual valve and is connected with the water outlet chamber, the second pipe section is provided with a pressure switch connected thereto and a hydraulic alarm bell, and the third pipe section is provided with a fifth manual valve and is connected with the water inlet cavity.

In some embodiments, each of the first pressure gauge, the first manual valve, the first solenoid valve, the anti-reset valve, the second pressure gauge, the PH meter, the second solenoid valve, the water inlet signal butterfly valve, the water outlet signal butterfly valve, the third manual valve, the third pressure gauge, the fourth manual valve, the pressure switch, the hydraulic alarm bell, and the fifth manual valve is connected with a controller of a deluge alarm system through a signaling device provided thereon.

Figure 1:
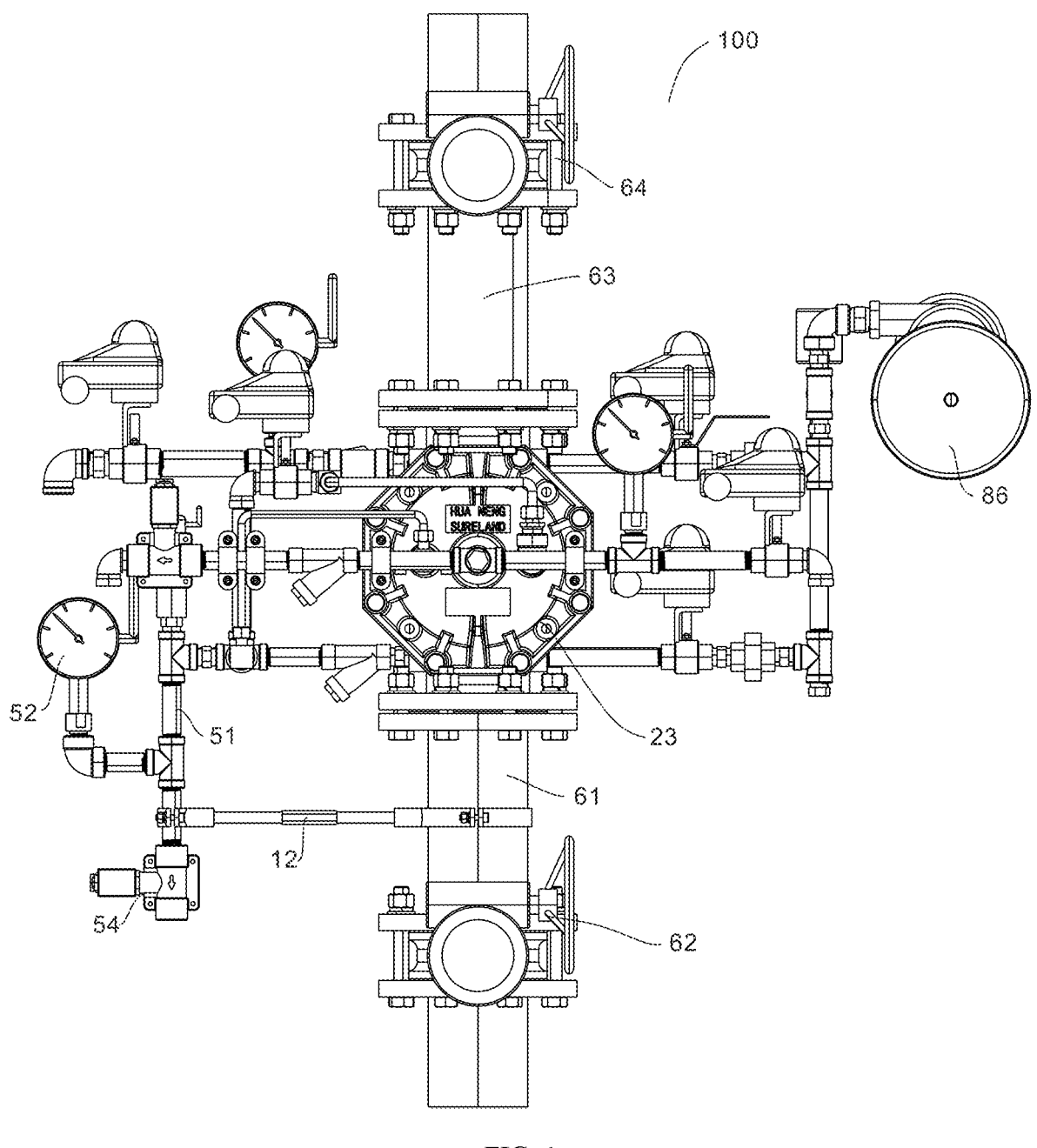
FIG. 1 is a front view of a deluge valve assembly according to an embodiment of the present invention.

REFERENCE NUMERALS deluge valve assembly 100;

first reinforcement member 11, second reinforcement member 12, and third reinforcement member 13;

deluge valve 2, valve body 21, seal member 22, valve cover 23, protruding stage 24, elastic member 25;

first pipe body 31, second pipe body 32, third pipe body 33, first pressure gauge 34, first manual valve 35, first filter 36, first solenoid valve 37;

fourth pipe body 41, second filter 42, first communication pipe 43, second communication pipe 44, first connecting pipe 45, first connecting sub-pipe 451, second connecting pipe 46, second connecting sub-pipe 461, anti-reset valve 47, second manual valve 48, one-way valve 49;

fifth pipe body 51, second pressure gauge 52, PH meter 53, and second solenoid valve 54;

water inlet pipe 61, water inlet signal butterfly valve 62, water outlet pipe 63, water outlet signal butterfly valve 64;

sixth pipe body 7, third pressure gauge 71, and third manual valve 72;

seventh pipe body 8, first pipe section 81, second pipe section 82, third pipe section 83, fourth manual valve 84, pressure switch 85, hydraulic alarm bell 86, and fifth manual valve 87.

DETAILED DESCRIPTION OF THE INVENTION

Embodiments of the present invention are described in detail below, and examples of which are illustrated in the accompanying drawings. The embodiments described below with reference to the drawings are exemplary and are intended to explain the present invention and are not to be construed as limiting the present invention.

The following describes the deluge valve assembly 100 according to embodiments of the present invention with reference to the accompanying drawings. As shown in FIGS. 1 to 9, a deluge valve assembly 100 according to an embodiment of the present invention includes a deluge valve 2, a water inlet pipeline, a water outlet pipeline, and reinforcement members.

The deluge valve 2 includes a water inlet cavity, a water outlet cavity, and a diaphragm cavity. The water inlet cavity is suitable for communication with a fire protection pipe network, so as to make water from the fire protection pipe network flow into the water inlet cavity. An inlet of the water inlet pipeline is connected with the water inlet cavity, and an outlet of the water inlet pipeline is connected with the diaphragm cavity. An inlet of the water outlet pipeline is connected with the diaphragm cavity. At least two of the deluge valve 2, the water inlet pipeline, and the water outlet pipeline are connected with each other through reinforcement members.

In the deluge valve assembly 100 according to an embodiment of the present invention, at least two of the deluge valve 2, the water inlet pipeline, and the water outlet pipeline are connected with each other through reinforcement members, thereby improving structural stability of the deluge valve assembly 100. Specifically, at least two of the deluge valve 2, the water inlet pipeline, and the water outlet pipeline are connected with each other through reinforcement members, which can include: a. the deluge valve 2 and the water inlet pipeline are connected with each other through the reinforcement members, thereby improving the structural stability of the water inlet pipeline; b. the deluge valve and the water outlet pipeline are connected with each other through the reinforcement members, thereby improving the structural stability of the water outlet pipeline; c. the water inlet pipeline and the water outlet pipeline are connected with each other through the reinforcement members, thereby improving the structural stability of the water inlet pipeline and the water outlet pipeline; d. the deluge valve 2, the water inlet pipeline, and the water outlet pipeline are connected with each other through the reinforcement members, thereby improving the structural stability of the water inlet pipeline and the water outlet pipeline; e. any two of the deluge valve 2, the water inlet pipeline, and the water outlet pipeline are connected with each other through the reinforcement members, thereby further improving the structural stability of the water inlet pipeline and the water outlet pipeline. In the deluge valve assembly 100 according to an embodiment of the present invention, by using the reinforcement members, at least two of the deluge valve 2, the water inlet pipeline, and the water outlet pipeline can improve the structural stability of at least one of the water inlet pipeline and the water outlet pipeline, so as to make the deluge valve assembly 100 have good performance in anti-vibration and not easily damaged, thereby making the deluge valve assembly 100 have a long service lifetime and good reliability.

Therefore, the deluge valve assembly 100 according to an embodiment of the present invention has the advantages of good performance in anti-vibration and reliability.

As shown in FIGS. 1 to 9, the deluge valve assembly 100 according to an embodiment of the present invention includes a deluge valve 2, a water inlet pipeline, a water outlet pipeline, and reinforcement members, in which at least two of the deluge valve 2, the water inlet pipeline, and the water outlet pipeline are connected with each other through reinforcement members.

As shown in FIGS. 1 to 6 and 9, in some embodiments, the reinforcement members include a first reinforcement member 11, a second reinforcement member 12, and a third reinforcement member 13. The deluge valve 2 and the water outlet pipeline are connected with each other through the first reinforcement emeber11. The deluge valve 2 and the water inlet pipeline are connected with each other through the second reinforcement member 12. The water outlet pipeline and the water inlet pipeline are connected with each other through the third reinforcement member 13. That is, any two of the deluge valve 2, the water inlet pipeline, and the water outlet pipeline are connected with each other through the corresponding reinforcement members, so as to improve the structural stability of the deluge valve assembly 100. For example, the first reinforcement member 11, the second reinforcement member 12, and the third reinforcement member 13 are all rigidly connected reinforcement members including rod bodies.

The deluge valve 2 includes a water inlet cavity, a water outlet cavity, and a diaphragm cavity. The water inlet cavity is suitable for communication with a fire protection pipe network, so that the water from the fire protection pipe network can flow into the water inlet cavity. That is, the deluge valve 2 is a diaphragm type deluge valve.

As shown in FIGS. 1 to 6 and 9, in some embodiments, the deluge valve 2 includes a valve body 21, a seal member 22, and a valve cover 23, in which the valve body 21 has a water inlet cavity and a water outlet cavity.

The seal member includes a mounting ring and a diaphragm located inside the mounting ring, in which the valve body 21, the mounting ring and the valve cover 23 are connected with each other in sequence in a first direction. The seal member 22 and the valve cover 23 define a diaphragm cavity, and the diaphragm is movable in the first direction so that the diaphragm has a first position and a second position. In the first position, the water inlet cavity and the water outlet cavity are separated by the diaphragm; in the second position, the water inlet cavity and the water outlet cavity are connected with each other; in the operation of the diaphragm moving from the first position to the second position, the diaphragm moves in the first direction toward the neighborhood of the valve cover 23.

Figure 2:
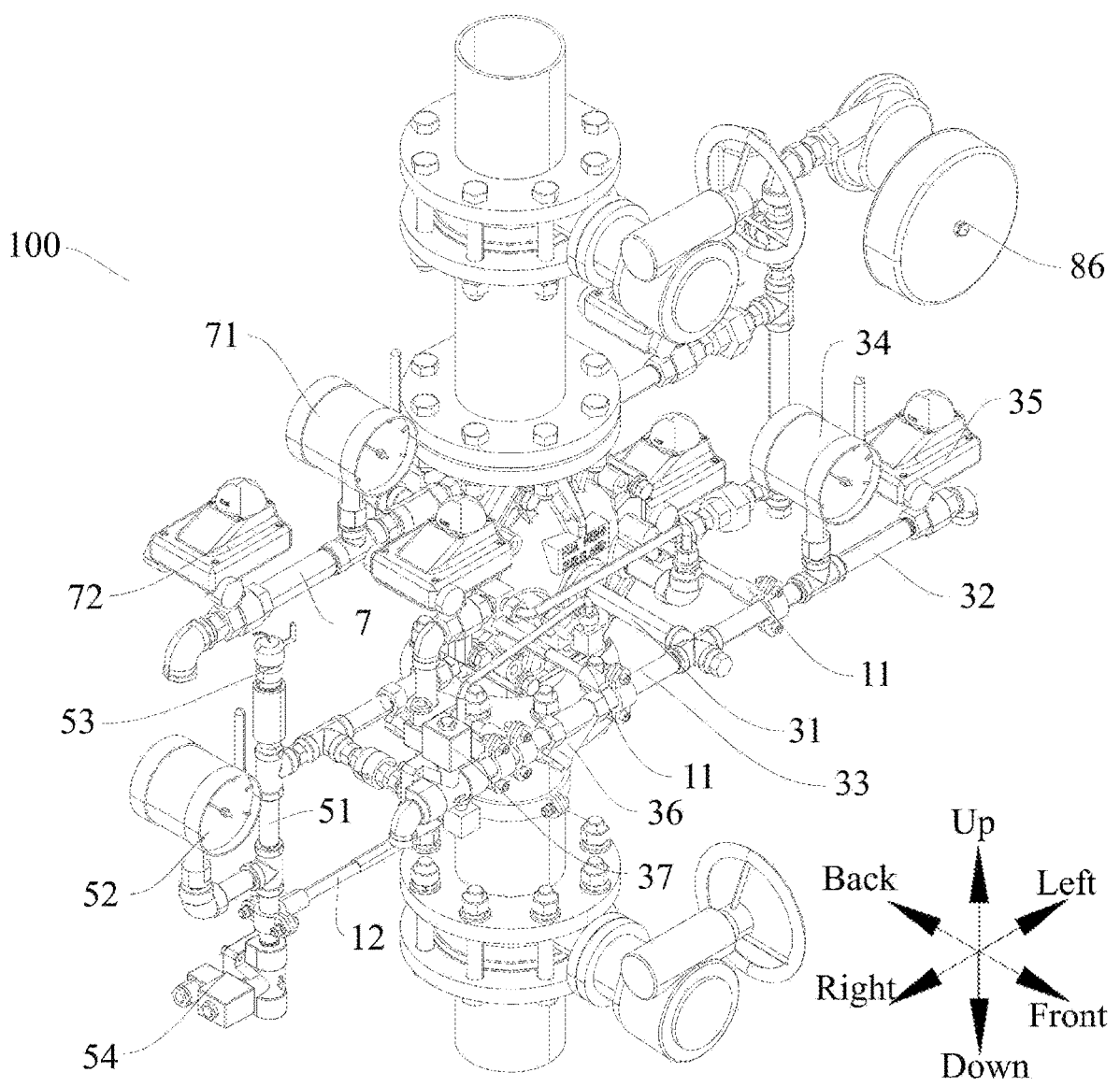
FIG. 2 is a perspective view of a deluge valve assembly according to an embodiment of the present invention.
Figure 3:
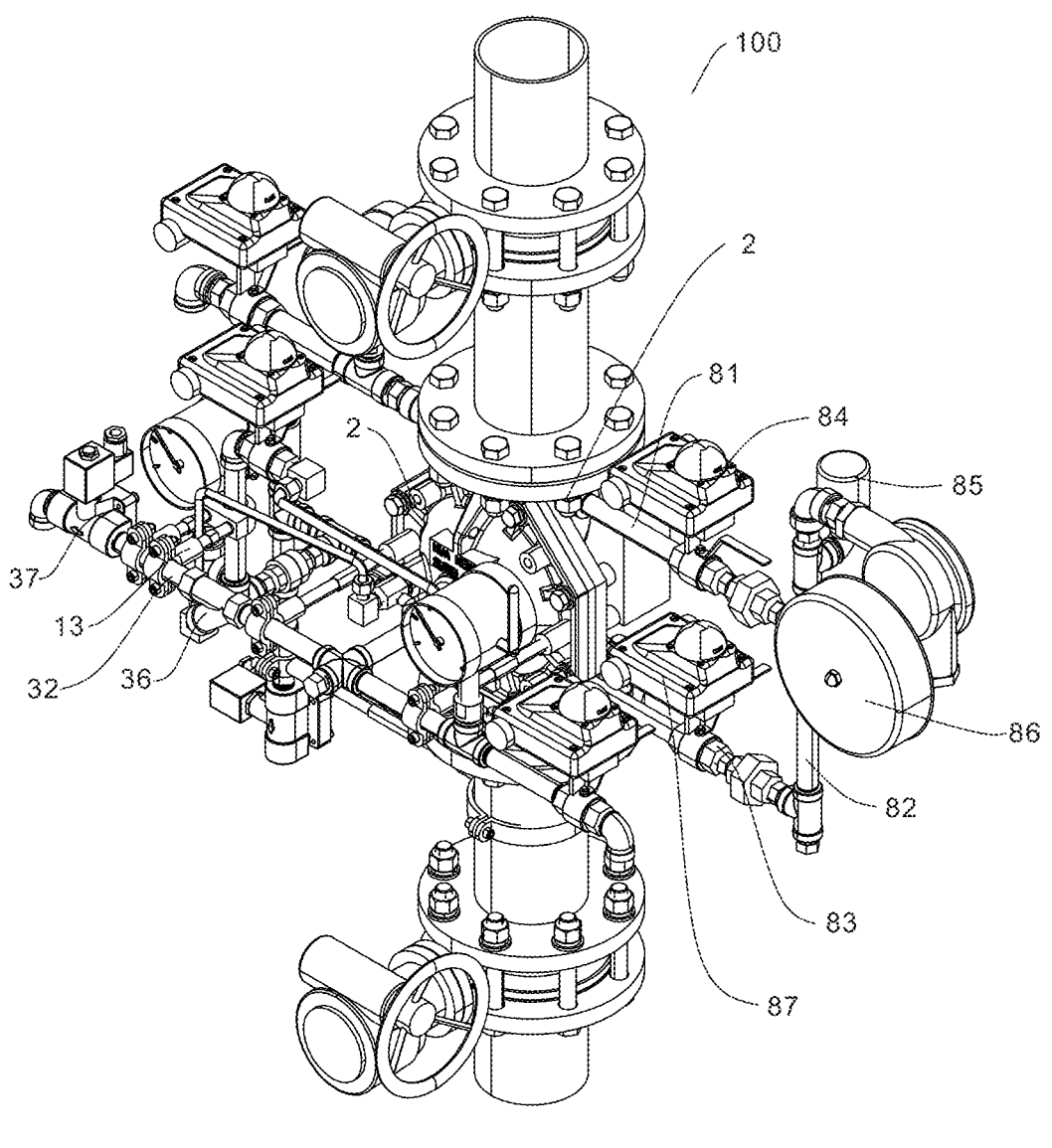
FIG. 3 is a perspective view of a deluge valve assembly according to an embodiment of the present invention.
Figure 4:
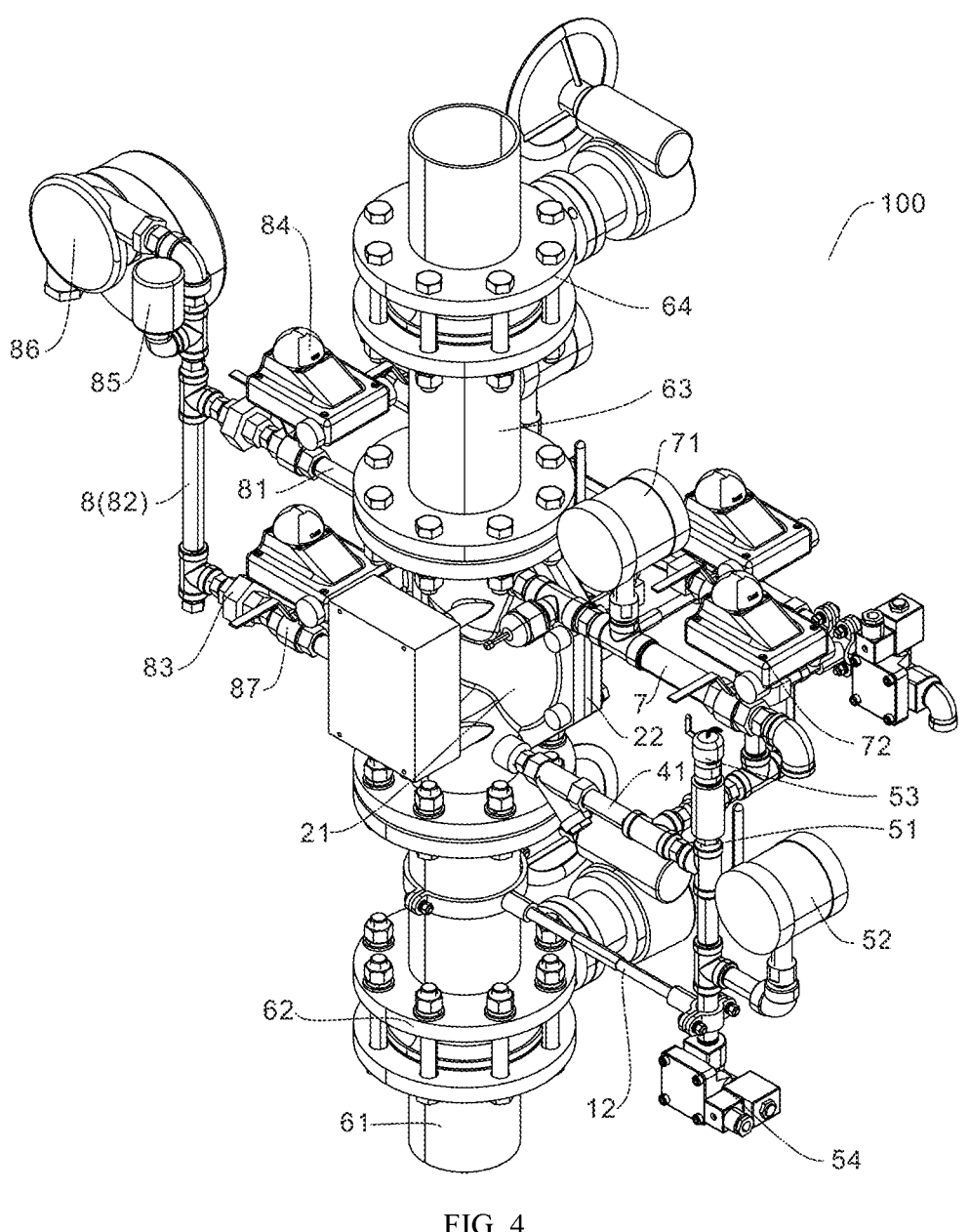
FIG. 4 is a perspective view of a deluge valve assembly according to an embodiment of the present invention.

The first direction may be a front-to-back direction, as shown by the arrows in FIG. 2. For example, the valve body 21, the mounting ring, and the valve cover 23 are connected with each other in sequence from back to front. The first position is located at the back side of the second position, and, in the operation of the diaphragm moving from back to front, the diaphragm is adjacent to the valve cover 23 and connects the water inlet cavity to the water outlet cavity.

Figure 8:
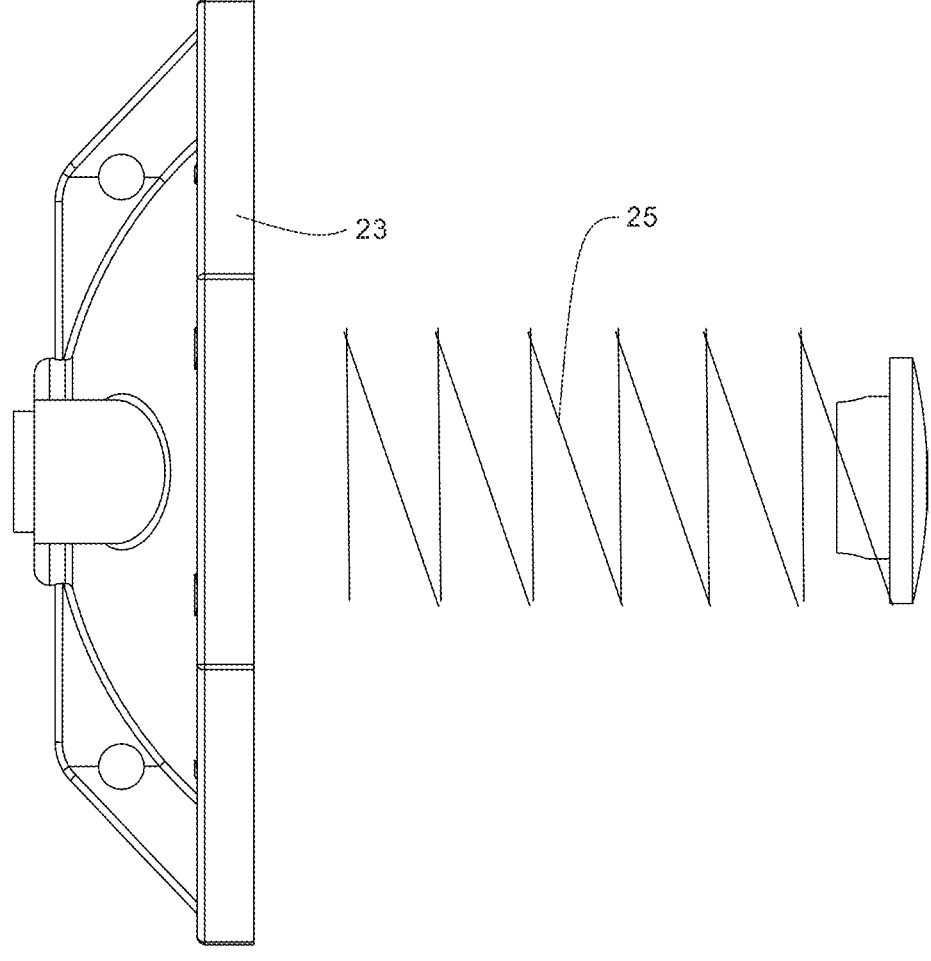
FIG. 8 is a schematic diagram of a valve cover and an elastic member according to an embodiment of the present invention.
Figure 9:
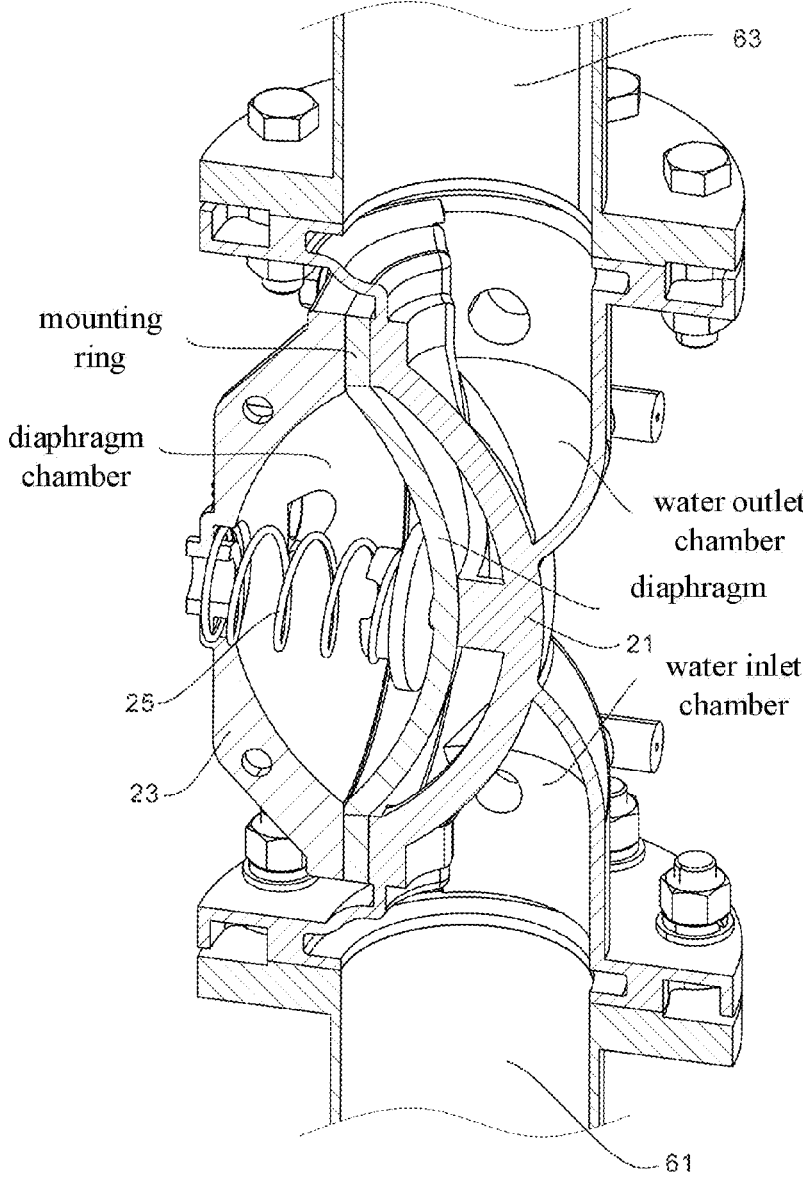
FIG. 9 is a sectional view of the deluge valve group according to an embodiment of the present invention.

As shown in FIG. 8 and FIG. 9, in some embodiments, an elastic member 25 connected with the diaphragm and the valve cover 23 is provided in the diaphragm cavity, and the elastic member 25 can elastically deform in the first direction. Therefore, the elastic member 25 can cause the diaphragm to move away from the valve cover 23 in the first direction, thereby preventing the diaphragm from leaving the first position when it is vibrated. That is, the resetting ability of the diaphragm can get improved, and accordingly the anti-vibration performance of the deluge valve 2 is improved.

As shown in FIGS. 1 to 6 and FIG. 9, in some embodiments, the deluge valve 2 further includes a water inlet pipe 61 and a water outlet pipe 63.

The water inlet pipe 61 is connected with the water inlet cavity, and the water inlet pipe 61 is provided with a water inlet signal butterfly valve 62. The water outlet pipe 63 is connected with the water outlet cavity, and the water outlet pipe 63 is provided with a water outlet signal butterfly valve 64. The water inlet pipe 61 and the water outlet pipe 63 are located on both sides of the valve body 21 in the third direction. Specifically, the water inlet pipe 61 is connected with the valve body 21 through a flange and communicates with an inlet of the water inlet cavity, and the water outlet pipe 63 is connected to the valve body 21 through a flange and communicates with an outlet of the water outlet cavity. The water inlet signal butterfly valve 62 is at an open mode in a servo state and at a close mode in a maintenance state; the water outlet signal butterfly valve 64 is at an open mode in a servo state and at a close mode in a maintenance state. The third direction may be an up-down direction, as shown by the arrows in FIG. 2. For example, the water inlet pipe 61 is located below the valve body 21, and the water outlet pipe 63 is located above the valve body 21.

An inlet of the water outlet pipe is connected with the diaphragm cavity, so that, when the water inside the diaphragm cavity flows out of the water outlet pipe, the water pressure in the water inlet cavity causes the diaphragm to move from the first position to the second position, thereby making the water inlet cavity communicate with the water outlet cavity.

As shown in FIGS. 1 to 7, in some embodiments, a plurality of protruding stages 24 are provided on an outer surface of the valve cover 23, in which a first end of the first reinforcement member 11 is connected to the protruding stages 24, and a second end of the first reinforcement member 11 is connected to the water outlet pipe. Specifically, each of the protruding stages 24 has a mounting slot, in which a first end of the first reinforcement member 11 is threadedly connected to the mounting slot, and a second end of the first reinforcement member 11 is provided with a pipe clamp connected with the water outlet pipe. The number of the protruding stages 24 is more than one, so as to facilitate the mounting with the reinforcement members. The first end of the first reinforcement 11 is provided with external threads for threaded connection with the mounting slots.

As shown in FIGS. 1 to 6 and FIG. 9, in some embodiments, the water outlet pipeline includes a first pipe body 31, a second pipe body 32, and a third pipe body 33.

The first tube body 31 extends along the first direction. One end of the first tube body 31 is provided on the valve cover 23 and communicates with the diaphragm cavity, and another end of the first tube body 31 is connected with the second tube body 32 and the third tube body through a tee. The second tube body 32 and the third tube body 33 both extend along a second direction, and the second tube body 32 and the third tube body 33 are located on both sides of the first tube body 31 in the second direction. That is, the second tube body 32 and the third tube body 33 are connected with the diaphragm cavity through the first tube body 31 so that the water in the diaphragm cavity can flow into the second tube body 32 and the third tube body 33.

The number of the first reinforcement members 11 is two. The two first reinforcement members 11 are located on both sides of the first pipe body 31 in the second direction, and the second ends of the two first reinforcement members 11 are connected with the second pipe body 32 and the third tube body 33, respectively. Specifically, the first reinforcement member 11 is a rod-shaped structure extending along the first direction. The first ends of the two first reinforcement members 11 are inserted into the mounting slots of the two protruding stages 24, respectively, and are threadedly connected with the protruding stages 24. A second end of one of the first reinforcement members 11 is provided with a pipe clamp that is sleeved on the outer peripheral side of the second pipe body 32, and a second end of another one of the two first reinforcement members 11 is provided with a pipe clamp that is sleeved on the outer peripheral side of the third pipe body 33.

The second pipe body 32 is provided with a first pressure gauge 34. The first pipe body 31, the second pipe body 32, and the third pipe body 33 are connected with each other; that is, the first pressure gauge 34 can detect the water pressure in the water pipeline (the first pipe body 31, the second pipe body 32, and the third pipe body 33). A first manual valve 35 is provided at an outlet of the second pipe body 32, such that water in the diaphragm cavity can flow out through the second pipe body 32 by opening the first manual valve 35. The first manual valve 35 is provided with a signaling device that can detect the opening and closing device of the first manual valve 35 and send the information to a controller of a deluge alarm system.

The third pipe body 33 is provided with a first filter 36, and an outlet of the third pipe body 33 is provided with a first solenoid valve 37. Therefore, after the first solenoid valve 37 is opened, water inside the diaphragm cavity can flow out of the diaphragm cavity through the third pipe body 33. The first filter 36 can filter impurities in water flowing inside the third pipe body 33. The first solenoid valve 37 is opened when powered and closed when powered off, and is opened in the working state and closed in the servo state. The first manual valve 35 serves as a backup manual valve. When the first solenoid valve 37 fails, the first manual valve 35 can be opened to allow water in the diaphragm cavity to flow out, thereby reducing the pressure in the diaphragm cavity.

The second direction may be a left-right direction, as shown by the arrows in FIG. 2. For example, the first tube body 31 is provided on a front side of the valve cover 23 and extends in the front-and-back direction. The second tube body 32 and the third tube body 33 both extend in the left-and-right direction and are located on the left and right sides of the first tube body 31. The two first reinforcement members 11 are located on the left and right sides of the first tube body 31, and the second tube body 32 is located on the left side of the third tube body 33, in which a front end portion of the first tube body 31 is connected with the second tube body 32 and the third tube body 33 through a tee.

As shown in FIGS. 1 to 6 and 9, an inlet of the water inlet pipeline is connected with the water inlet cavity, and an outlet of the water inlet pipeline is connected with the diaphragm cavity. As such, the pressure in the water inlet cavity can be made equal to the pressure in the diaphragm cavity, so that the diaphragm is in the first position and separates the water inlet cavity and the water outlet cavity.

In some embodiments, the water inlet pipeline includes a fourth pipe body 41 and a connecting pipe.

The fourth pipe body 41 extends along the second direction. The fourth pipe body 41 is connected with the valve body 21, and the fourth pipe body 41 is provided with a second filter 42. The connecting pipe is provided with a one-way valve 49, and the water inlet cavity, the fourth pipe body 41, the connecting pipe, and the diaphragm cavity are connected with each other in sequence. Specifically, the fourth tube body 41 is located on one side of the valve body 21 in the second direction. The water inlet cavity is connected with the diaphragm cavity through the fourth pipe body 41 and the connecting pipe, and the second filter 42 can prevent impurities from entering the diaphragm cavity. For example, the fourth pipe body 41 is located on the right side of the valve body 21 and extends in the left-and-right direction.

In some embodiments, the water inlet pipeline further includes a first communication pipe 43 and a second communication pipe 44. The first communication pipe 43 and the second communication pipe 44 are both provided on the valve cover 23 and communicate with the diaphragm cavity, such that water in the connecting pipe can enter the diaphragm cavity from the first communication pipe 43 and the second communication pipe 44. The first communication pipe 43 and the second communication pipe 44 are located on both sides of the first tube body 31 in the second direction, such that water can enter the diaphragm cavity evenly. The first communication pipe 43 is provided with an anti-reset valve 47, in which the anti-reset valve 47 has a water outlet. When the diaphragm cavity needs to discharge water, the anti-reset valve 47 can be opened to prevent water from flowing into the diaphragm cavity. For example, the first communication pipe 43 and the second communication pipe 44 both extend in the front-and-back direction, and the first communication pipe 43 and the second communication pipe 44 are located on both sides of the first tube body 31 in the left-and-right direction. The valve cover 23 is provided with a protruding ring communicating with the first communication pipe 43 and the second communication pipe 44.

Figure 5:
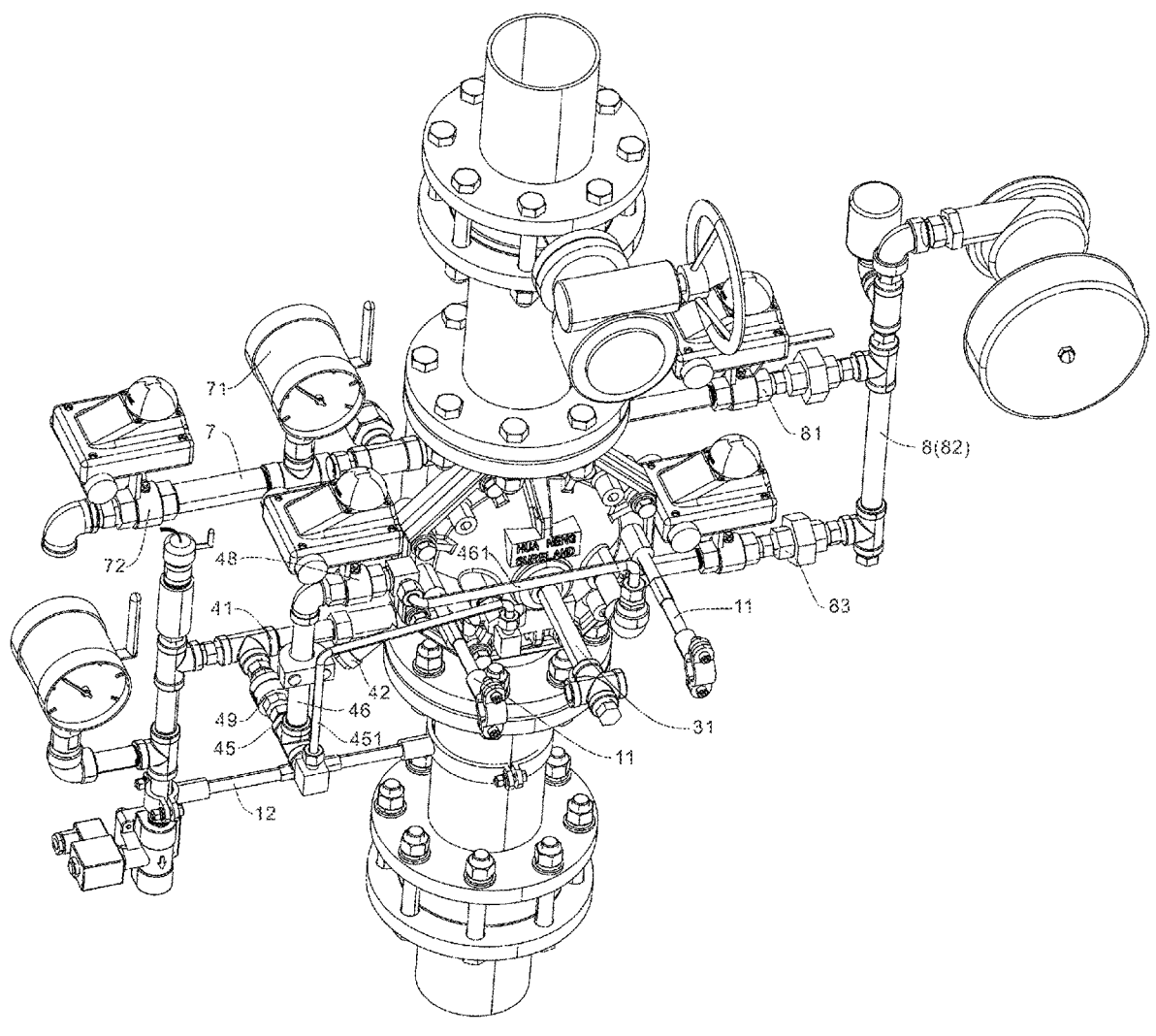
FIG. 5 is a schematic diagram of a water inlet pipeline according to an embodiment of the present invention.
Figure 6:
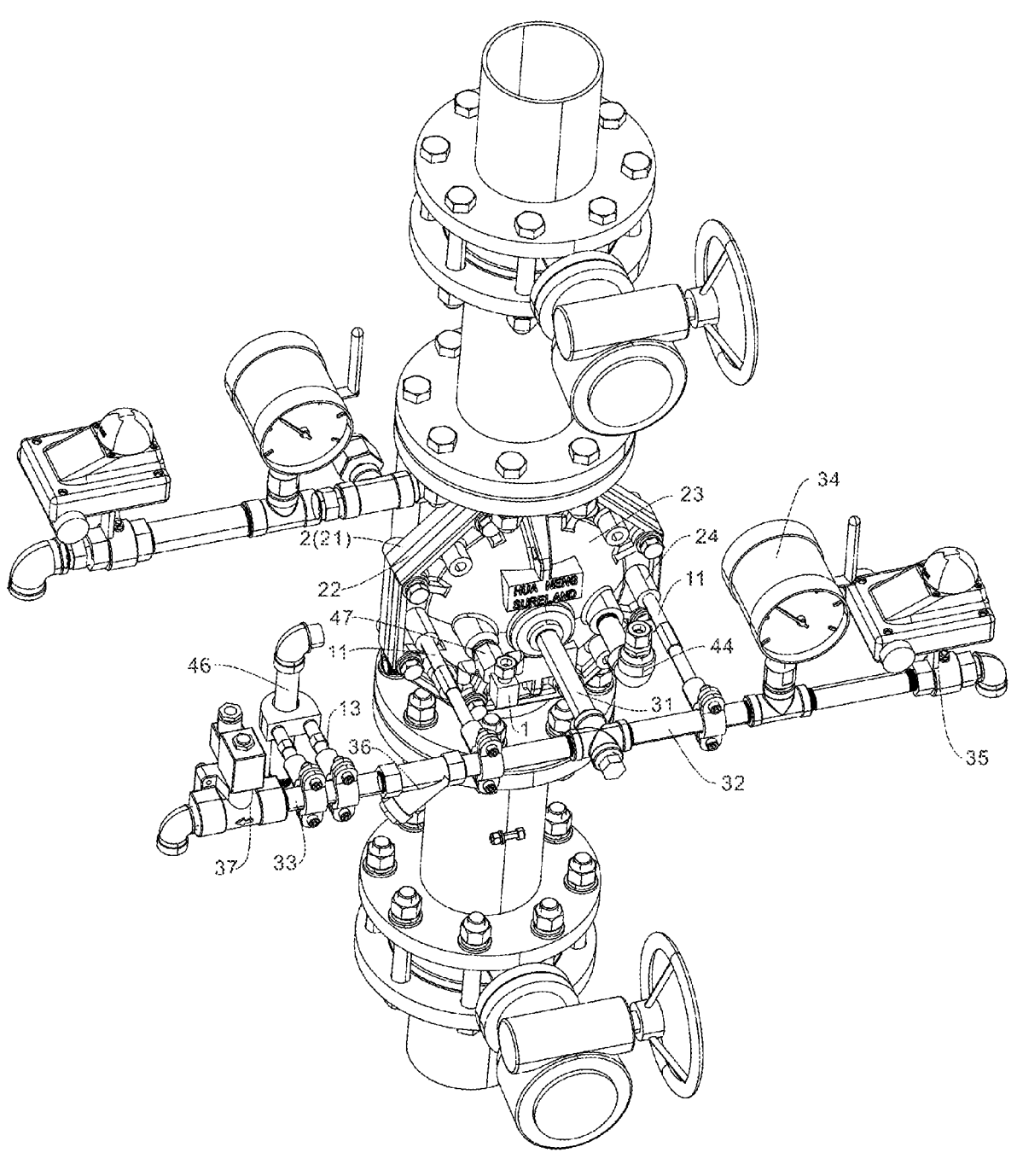
FIG. 6 is a schematic diagram of a water outlet pipeline according to an embodiment of the present invention.
Figure 7:
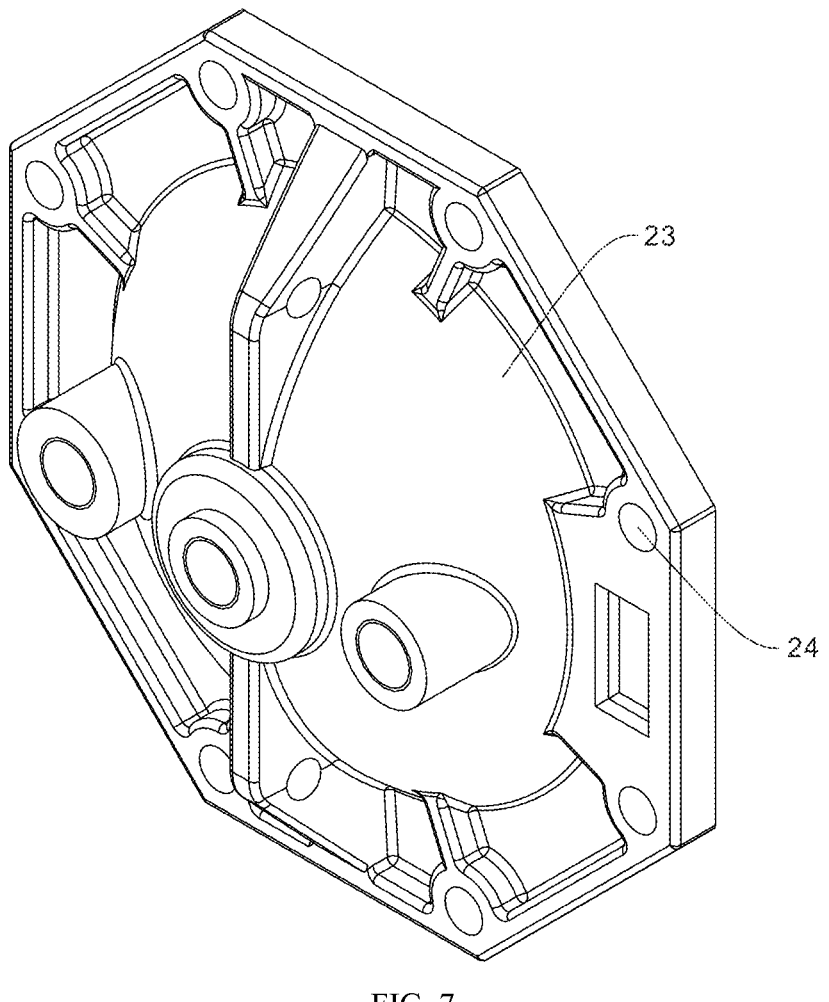
FIG. 7 is a perspective view of a valve cover according to an embodiment of the present invention.

As shown in FIG. 5, the connecting pipe includes a first connecting pipe 45, a first connecting sub-pipe 451, a second connecting pipe 46, and a second connecting sub-pipe 461.

The first connecting pipe 45 extends along the first direction. The one-way valve 49 is provided on the first connecting pipe 45. The fourth pipe body 41, the first connecting pipe 45, the first connecting sub-pipe 451, and the first communication pipe 43 are connected with each other in sequence. The second connecting pipe 46 extends along the third direction. The fourth pipe body 41, the first connecting pipe 45, the second connecting pipe 46, the second connecting sub-pipe 461, and the second communication pipe 44 are connected with each other in sequence. A second manual valve 48 is provided on the second connecting pipe 46, in which any two of the first direction, the second direction, and the third direction are perpendicular to each other. That is, the water inlet cavity can be connected with the diaphragm cavity through the fourth pipe body 41, the first connecting pipe 45, the first connecting sub-pipe 451, and the first communication pipe 43; and the water inlet cavity can also be connected with the diaphragm cavity through the fourth pipe body 41, the first connecting pipe 45, the second connecting tube 46, the second connecting sub-tube 461, and the second communication pipe 44. The second connecting pipe 46 is provided with a second manual valve 48 such that a flow rate of water flowing in the second connecting pipe 46 can be adjusted, so as to coordinate the flow rate and pressure of the water flowing in the first connecting sub-pipe 451 and the second connecting sub-pipe 461, thereby making water entering the diaphragm cavity even.

For example, the first connecting pipe 45 extends in the front-and-back direction, and the second connecting pipe 46 extends in the up-and-down direction. The back end of the first connecting pipe 45 is connected with the right end of the fourth pipe body 41, and the front end of the first connecting pipe is connected with the first connecting sub-pipe 451. The front end of the first connecting pipe is connected with the lower end of the second connecting pipe 46, and the upper end of the second connecting pipe 46 is connected with the second connecting sub-pipe 461. The first connecting sub-tube 451 and the second connecting sub-tube 461 are both copper tubes, which facilitates bending for the first connecting sub-tube 451 and the second connecting sub-tube 461.

One end of the third reinforcement member 13 is connected with the connecting pipe, and another end of the third reinforcement member 13 is connected with the water outlet pipeline. Specifically, the third reinforcement member 13 extends along the first direction, in which one end of the third reinforcement member 13 is connected with the second connecting pipe 46, and another end of the third reinforcement member 13 is connected with the third pipe body 33. For example, the back end of the third reinforcing member 13 is sleeved on the outer peripheral side of the second connecting pipe 46, the pipe clamp at the front end of the third reinforcing member 13 is sleeved on the outer peripheral side of the third pipe body 33, and the number of rod bodies of the third reinforcement member 13 is two and they are located on both sides of the first connecting sub-tube 451.

As shown in FIG. 1 to 5, in some embodiments, the water inlet pipeline further includes a fifth pipe body 51 connected with the fourth pipe body 41. The fifth pipe body 51 extends along the third direction. The fifth pipe body 51 is provided with a second pressure gauge 52 and a PH meter 53. A second solenoid valve 54 is provided at an outlet of the fifth pipe body 51. The fifth pipe body 51 is connected with the deluge valve 2 through the second reinforcement member 12, in which any two of the first direction, the second direction, and the third direction are perpendicular to each other. That is, the fifth pipe body 51 can communicate with the water inlet cavity through the fourth pipe body 41. As such, water in the water inlet cavity can enter the fifth pipe body 51 such that the second pressure gauge 52 can detect the pressure of the water flowing in the water inlet cavity. The PH meter 53 can monitor the PH value of water quality in real time, in which the normal value is to be between 6 and 9. If it exceeds this range, there will be an alarm and it is to link and thus open the second solenoid valve 54 for implementing replacement for water quality. If it still cannot return to the normal range within a certain period of time, relevant personnel can be notified for further processing.

Both ends of the second reinforcement member 12 are connected to the fifth pipe body 51 and the water inlet pipe 61, respectively, thereby improving the structural stability of the fifth pipe body 51 well. Specifically, the first reinforcement member 12 extends along the second direction. For example, the rod body of the second reinforcement member 12 extends in the left-and-right direction, and the pipe clamps at the left and right ends of the rod body of the first reinforcement member 12 are respectively sleeved on the outer peripheral side of the fifth pipe body 51 and the outer peripheral side of the water inlet pipe 61.

As shown in FIGS. 1 to 6 and 9, the deluge valve assembly 100 according to the embodiment of the present invention further includes a sixth pipe body 7 and a seventh pipe body 8.

An inlet of the sixth pipe body 7 is connected with the water outlet cavity. The sixth pipe body 7 is provided with a third pressure gauge 71 and a drip valve. An outlet of the sixth pipe body 7 is provided with a third manual valve 72. The third pressure gauge 71 can detect the pressure of the water flowing in the water outlet cavity, and the third manual valve 72 can be configured to open and close an outlet of the sixth pipe body 7. As such, after completing the fire extinguishing, the third manual valve 72 can be opened to discharge the water in the water outlet cavity.

The seventh pipe body 8 and the sixth pipe body 7 are located on both sides of the valve body 21 in the second direction. The seventh pipe body 8 includes a first pipe section 81, a second pipe section 82, and a third pipe section 83 that are connected with each other in sequence. The first pipe section 81 is provided with a fourth manual valve 84 and is connected with the water outlet cavity. The second pipe section 82 is provided with a pressure switch 85 connected thereto and a hydraulic alarm 86. The third pipe section 83 is provided with a fifth manual valve 87 and is connected with the water inlet cavity. The pressure switch 85 has no signal in the servo state and has a signal in the working state, and has a signal in the debugging state. When the fourth manual valve 84 and the fifth manual valve 87 are opened, water in the water outlet cavity can enter the water inlet cavity through the first pipe section 81, the second pipe section 82, and the third pipe section 83 in sequence. Also, during the above operation, the pressure switch 85 can detect the pressure of the water flowing in the second pipe section 82, so as to understand the pressure of the water flowing in the water outlet cavity. After the water flows to pass through the second pipe section 82, it can be directed into the hydraulic alarm bell 86, so that the hydraulic alarm bell 86 can sound an alarm to alert the staff. For example, the seventh pipe body 8 is located on the left side of the valve body 21, and the sixth pipe body 7 is located on the right side of the valve body 21. The first pipe section 81 and the third pipe section 83 extend in the left-and-right direction, and the second pipe section 82 extends in the up-an-down direction.

In some embodiments, each the first pressure gauge 34, the first manual valve 35, the second manual valve 48, the first solenoid valve 37, the anti-reset valve 47, the second pressure gauge 52, the pH meter 53, the second solenoid valve 54, the water inlet signal butterfly valve 62, the water outlet signal butterfly valve 64, the third manual valve 72, the third pressure gauge 71, the fourth manual valve 84, the pressure switch 85, the hydraulic alarm 86, and the fifth manual valve 87 is connected with a controller of a deluge alarm system through a signaling device provided thereon. Each the first pressure gauge 34, the first manual valve 35, the second manual valve 48, the first solenoid valve 37, the anti-reset valve 47, the second pressure gauge 52, the pH meter 53, the second solenoid valve 54, the water inlet signal butterfly valve 62, the water outlet signal butterfly valve 64, the third manual valve 72, the third pressure gauge 71, the fourth manual valve 84, the pressure switch 85, the hydraulic alarm 86, and the fifth manual valve 87 can be used as an information collection point by using the signaling device provided thereon. The controller of the deluge alarm system can obtain the information of each part through multiple information collection points, so that the controller can monitor the conditions of each part of the deluge valve assembly 100 for timely maintenance and fire extinguishing. Also, the data on the controller of the deluge alarm system can be transmitted to the APP on the mobile device. By multi-dimensional visualization combined with technical means such as monitoring facilities and the Internet of Things, full-coverage monitoring of the deluge alarm system is achieved, and multiple components in the facility are systematically integrated to monitor the opening, closing, starting, stopping and real-time analog data of each component in real time, such that the deluge valve assembly can be more intuitively and all-round monitoring in all aspects. The pH meter 53 is an online pH meter. By the Lora protocol signal of the Internet of Things, the real-time data of each part of the deluge valve assembly 100 is digitally monitored, and signal data such as water pressure, butterfly valve, opening and closing of ball valve, and pressure are visualized and fed back in real time, so that monitoring personnel can receive it in real time and effectively for equipment monitoring and maintenance with the highest efficiency. By installing wireless digital pressure gauges (first pressure gauge 34, second pressure gauge 5, and third pressure gauge

71) in the water inlet cavity, the water outlet cavity, and the diaphragm cavity, real-time pressure and pressure fluctuation curves are systematically monitored. When the water pressure is insufficient or when there is overpressure, the system will issue an abnormal reminder and inform all APP users that the location needs maintenance. By the visualization area, the solenoid valves (the first solenoid valve 37 and the second solenoid valve 54) in the deluge alarm system can be monitored, in response to the normal opening and closing of the power-on state, the power-off state, and the servo state. When encountering an abnormal situation, an abnormal notification can be sent out.

By monitoring the signal butterfly valves of the water inlet cavity and the water outlet cavity (the water inlet signal butterfly valve 62 and the water outlet signal butterfly valve 64), it is monitored whether the equipment is opened in normal standby (server state) and whether it is effectively closed in the maintenance state. The deluge alarm system can monitor the output signal of the pressure switch 85 with its pressure-increasing state, and capture the signal whether the pressure switch 85 is operating normally or on standby. By installing pressure display devices (first pressure gauge 34, second pressure gauge 52 and third pressure gauge 71) on the water inlet cavity, the water outlet cavity and the diaphragm cavity, an abnormal notification can be sent out at a situation as being pressure-free of the water inlet cavity and diaphragm cavity in the servo state, effectively notifying for the abnormality of no pressure in the water outlet cavity in the non-servo state.

The first manual valve 35, the second manual valve 48, the third manual valve 72, the fourth manual valve 84, and the fifth manual valve 87 are all manual emergency signal feedback locking ball valves. In the deluge alarm system, the ball valve can be fed back according to the signals of manual emergency and manual reset, and unified monitoring can be carried out for the three situations of emergency, main valve reset, and servo state, thereby monitoring the abnormality for the main valve during resetting and opening and after resetting. Moreover, the test status and maintenance states of the water outlet cavity at drainage and test and water inlet cavity at test can get effectively monitored, and the notifications for abnormality are given for the opening and closing of the signal feedback ball valve under non-matching behavior.

Any two of the deluge valve 2, the water inlet pipeline, and the water outlet pipeline are connected with each other through the corresponding reinforcement members, so that the deluge valve assembly 100 according to embodiments of the present invention has good performance in anti-vibration and reliability as well as high integration and compact structure.

In addition, the terms "first" and "second" are used for descriptive purposes only and cannot be understood as indicating or implying relative importance or implicitly indicating the quantity of indicated technical features. Therefore, features defined as "first" and "second" may explicitly or implicitly include at least one of these features. In the description of the present invention, unless otherwise expressly and specifically limited, the meaning of "plurality" refers to at least two, such as two, three, etc.

In the present invention, unless otherwise clearly stated and limited, the terms "mounting", "connecting with", "connecting to", "fixing" and other terms should be understood in a broad sense. For example, it can be a fixed connection or a detachable connection, or integrated; it can be mechanically connected, electrically connected or communicable with each other; unless otherwise expressly limited, it can be directly connected, or it can be indirectly connected through an intermediary, it can be the internal connection of two elements or the interaction between two elements. For those of ordinary skill in the art, the specific meanings of the above terms in the present invention can be understood according to specific circumstances.

In the present invention, unless otherwise expressly stated and limited, a first feature being "on" or "below" a second feature may mean that the first and second features are in direct contact, or the first and second features are in indirect contact through an intermediate medium. Furthermore, the terms "above", "over" and "on" may mean the first feature is above the second feature may mean that the first feature is directly above or diagonally above the second feature, or simply means that the first feature is higher in level than the second feature. "Below", "under" and "beneath" may mean the first feature is directly below or diagonally below the second feature, or simply means that the first feature has a smaller horizontal height than the second feature.

In the present disclosure, the terms "an embodiment", "some embodiments", "example", "specific example", or "some examples" etc. mean the specific features, structures, materials or materials described in connection with the embodiment or example. Features are included in at least one embodiment or example of the present invention. In the present disclosure, the schematic expressions of the above terms are not necessarily directed to the same embodiment or example. Furthermore, the specific features, structures, materials or characteristics described may be combined in any suitable manner in any one or more embodiments or examples. In addition, those skilled in the art may combine and compose different embodiments or examples and features of different embodiments or examples described in the disclosure unless they are inconsistent with each other.

Although the above embodiments have been shown and described, it can be understood that the above embodiments are illustrative and should not be construed as limitations of the present invention. Changes, modifications, substitutions and varieties of the above embodiments which may be made by those of ordinary skill in the art are all within the protection scope of the present invention.

What is claimed is:
1. A deluge valve assembly, comprising:
   a deluge valve, wherein the deluge valve comprises a water inlet cavity, a water outlet cavity, and a diaphragm cavity, and the water inlet cavity is suitable for communication with a fire protection pipe network, so as to make water from the fire protection pipe network flow into the water inlet cavity;
   a water inlet pipeline, wherein an inlet of the water inlet pipeline is connected with the water inlet cavity, and an outlet of the water inlet pipeline is connected with the diaphragm cavity;
   a water outlet pipeline, wherein an inlet of the water outlet pipeline is connected with the diaphragm cavity;
   reinforcement members, wherein at least two of the deluge valve, the water inlet pipeline, and the water outlet pipeline are connected with each other through the reinforcement members;
   wherein the reinforcement members comprise:
   a first reinforcement member, wherein the deluge valve and the water outlet pipeline are connected with each other through the first reinforcement member;
   a second reinforcement member, wherein the deluge valve and the water inlet pipeline are connected with each other through the second reinforcement member;

a third reinforcement member, wherein the water outlet pipeline and the water inlet pipeline are connected with each other through the third reinforcement member;
   wherein the deluge valve comprises a valve body, a seal member, and a valve cover, wherein the seal member comprises a mounting ring and a diaphragm located inside the mounting ring, wherein the valve body, the mounting ring, and the valve cover are connected with each other in sequence in a first direction, the seal member and the valve cover define the diaphragm cavity, and the diaphragm is movable in the first direction so that the diaphragm has a first position and a second position, wherein, in the first position, the water inlet cavity and the water outlet cavity are separated by the diaphragm, and, in the second position, the water inlet cavity and the water outlet cavity are connected with each other;
   wherein a plurality of protruding stages are provided on an outer surface of the valve cover, a first end of the first reinforcement member is connected to the protruding stages, and a second end of the first reinforcement member is connected to the water outlet pipeline.
2. The deluge valve assembly according to claim 1, wherein the water outlet pipeline comprises:
   a first pipe body, wherein the first pipe body extends along the first direction;
   a second pipe body and a third pipe body, wherein an end of the first pipe body is provided on the valve cover and connects with the diaphragm cavity, another end of the first pipe body is connected with the second pipe body and the third pipe body through a tee, wherein the second pipe body and the third pipe body both extend along a second direction, the second pipe body and the third pipe body are located on both sides of the first pipe body in the second direction, the number of the first reinforcement members is two, the two first reinforcement members are located on both sides of the first pipe body in the second direction, and the second ends of the two first reinforcements are connected with the second pipe body and the third pipe body, respectively;
   wherein a first pressure gauge is provided on the second pipe body, and a first manual valve is provided at an outlet of the second pipe body;
   wherein a first filter is provided on the third pipe body, and a first solenoid valve is provided at an outlet of the third pipe body.
3. The deluge valve assembly according to claim 2, wherein the water inlet pipeline comprises:
   a fourth pipe body, wherein the fourth pipe body extends along the second direction, the fourth pipe body is connected with the valve body, and a second filter is provided on the fourth pipe body;
   a connecting pipe, wherein a one-way valve is provided on the connecting pipe, the water inlet cavity, the fourth pipe body, the connecting pipe, and the diaphragm cavity are connected with each other in sequence, wherein one end of the third reinforcement member is connected with the connecting pipe, and another end of the third reinforcement member is connected with the water outlet pipeline.
4. The deluge valve assembly according to claim 3, wherein the diaphragm cavity is provided with an elastic member inside connected with the diaphragm and the valve cover, and the elastic member is able to elastically deform in the first direction;

wherein each of the protruding stages has a mounting slot, the first end of the first reinforcement member is threadedly connected to the mounting slot, and the second end of the first reinforcement member is provided with a pipe clamp connected with the water outlet pipeline;

wherein the water inlet pipeline further comprises:

a first communication pipe and a second communication pipe, wherein the first communication pipe and the second communication pipe are both provided on the valve cover and communicate with the diaphragm cavity, the first communication pipe and the second communication pipe are located on opposite sides of the first pipe body in the second direction, and the first communication pipe is provided with an anti-reset valve;

wherein the connecting pipe comprises:

a first connecting pipe and a first connecting sub-pipe, wherein the first connecting pipe extends along the first direction, the one-way valve is provided on the first connecting pipe, and the fourth pipe body, the first connecting pipe, the first connecting sub-pipe, and the first communication pipe are connected with each other in sequence;

a second connecting pipe and a second connecting sub-pipe, wherein the second connecting pipe extends along a third direction, the fourth pipe body, the first connecting pipe, the second connecting pipe, the second connecting sub-pipe, and the second communication pipe are connected with each other in sequence, a second manual valve is provided on the second connecting pipe, and any two of the first direction, the second direction, and the third direction are perpendicular to each other;

wherein one end of the third reinforcement member is connected with the second connecting pipe, and another end of the third reinforcement member is connected with the third pipe body.

5. The deluge valve assembly according to claim 4, wherein the water inlet pipeline further comprises a fifth pipe body connected with the fourth pipe body, the fifth pipe body extends along the third direction, the fifth pipe body is provided with a second pressure gauge and a PH meter, wherein a second solenoid valve is provided at an outlet of the fifth pipe body, and the fifth pipe body is connected with the deluge valve through the second reinforcement member.

6. The deluge valve assembly according to claim 5, wherein the deluge valve further comprises:

a water inlet pipe, wherein the water inlet pipe is connected with the water inlet cavity, the water inlet pipe is provided with a water inlet signal butterfly valve, and both ends of the second reinforcement member are connected with the fifth pipe body and the water inlet pipe, respectively;

a water outlet pipe, wherein the water outlet pipe is connected with the water outlet cavity, the water outlet pipe is provided with a water outlet signal butterfly valve, and the water inlet pipe and the water outlet pipe are located on opposite sides of the valve body in the third direction.

7. The deluge valve assembly according to claim 6, further comprising:

a sixth pipe body, wherein an inlet of the sixth pipe body is connected with the water outlet cavity, a third pressure gauge is provided on the sixth pipe body, and a third manual valve is provided at an outlet of the sixth pipe body;

a seventh pipe body, wherein the seventh pipe body and the sixth pipe body are located on opposite sides of the valve body in the second direction, the seventh pipe body comprises a first pipe section, a second pipe section, and a third pipe section that are connected with each other in sequence, wherein the first pipe section is provided with a fourth manual valve and is connected with the water outlet chamber, the second pipe section is provided with a pressure switch connected thereto and a hydraulic alarm bell, and the third pipe section is provided with a fifth manual valve and is connected with the water inlet cavity.

8. The deluge valve assembly according to claim 7, wherein each of the first pressure gauge, the first manual valve, the first solenoid valve, the anti-reset valve, the second pressure gauge, the PH meter, the second solenoid valve, the water inlet signal butterfly valve, the water outlet signal butterfly valve, the third manual valve, the third pressure gauge, the fourth manual valve, the pressure switch, the hydraulic alarm bell, and the fifth manual valve is connected with a controller of a deluge alarm system through a signaling device provided thereon.

\* \* \* \* \*